United States Patent
Mihira

(10) Patent No.: US 10,203,916 B2
(45) Date of Patent: Feb. 12, 2019

(54) INFORMATION PROCESSING APPARATUS THAT CHANGES A MESSAGE TO BE DISPLAYED WHEN AN ICON IS OPERATED BY A USER, IN ACCORDANCE WITH SETTING REGARDING A NEAR FIELD WIRELESS COMMUNICATION FUNCTION, METHOD OF CONTROLLING THE SAME, AND NON-TRANSITORY STORAGE MEDIUM

(71) Applicant: CANON KABUSHIKI KAISHA, Tokyo (JP)

(72) Inventor: Yoshiro Mihira, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/223,802

(22) Filed: Jul. 29, 2016

(65) Prior Publication Data
US 2017/0046107 A1 Feb. 16, 2017

(30) Foreign Application Priority Data

Aug. 10, 2015 (JP) .................................. 2015-158498

(51) Int. Cl.
*G06F 3/12* (2006.01)
*G06F 3/0481* (2013.01)
(Continued)

(52) U.S. Cl.
CPC .......... *G06F 3/1231* (2013.01); *G06F 3/0484* (2013.01); *G06F 3/04817* (2013.01);
(Continued)

(58) Field of Classification Search
CPC ............ G03G 21/1657; G03G 21/1882; G06F 3/1292; H04N 2201/006; H04W 4/008; H04W 4/006
(Continued)

(56) References Cited

U.S. PATENT DOCUMENTS

2009/0153305 A1* 6/2009 Ambrosetti ............ G08B 21/24
340/10.31
2014/0096202 A1* 4/2014 Matsuda ................ H04W 4/008
726/4
(Continued)

FOREIGN PATENT DOCUMENTS

| JP | 2014-049896 A | 3/2014 |
|---|---|---|
| JP | 2015045972 A | 3/2015 |
| JP | 2015046780 A | 3/2015 |

OTHER PUBLICATIONS

May 19, 2017, Japanese Official Action (with English translation) in Japanese Patent Appln. No. 2015-158498.

*Primary Examiner* — Benny Q Tieu
*Assistant Examiner* — Juan M Guillermety
(74) *Attorney, Agent, or Firm* — Venable LLP

(57) ABSTRACT

An information processing apparatus having a near field wireless communication function can display a screen including an icon representing the near field wireless communication function, and set, as a setting about the near field wireless communication function, one of an ON setting for enabling the near field wireless communication function and an OFF setting for disabling the near field wireless communication function. If a user operates the icon on the screen, it is determined whether the ON setting or the OFF setting has been set, and a message based on a result of the determination is displayed.

13 Claims, 8 Drawing Sheets

(51) Int. Cl.
*H04W 4/80* (2018.01)
*G06F 3/0484* (2013.01)

(52) U.S. Cl.
CPC .......... *G06F 3/1236* (2013.01); *G06F 3/1237* (2013.01); *H04W 4/80* (2018.02)

(58) Field of Classification Search
USPC ....................................................... 358/1.15
See application file for complete search history.

(56) References Cited

U.S. PATENT DOCUMENTS

| | | | |
|---|---|---|---|
| 2014/0268231 A1* | 9/2014 | Ito ......................... | G06F 3/1292 358/1.15 |
| 2015/0062632 A1* | 3/2015 | Torii ..................... | G06F 3/1204 358/1.15 |
| 2015/0062633 A1* | 3/2015 | Asai ...................... | G06F 3/1292 358/1.15 |
| 2015/0317114 A1* | 11/2015 | Ito ......................... | G06F 3/1292 358/1.15 |
| 2015/0359021 A1* | 12/2015 | Tsujii ................... | H04W 4/008 455/41.1 |
| 2015/0382136 A1 | 12/2015 | Mihira et al. | |
| 2016/0277932 A1* | 9/2016 | Nakamura ............ | G06F 3/1292 |
| 2016/0378410 A1* | 12/2016 | Inoue .................... | G06F 3/1292 358/1.15 |

\* cited by examiner

INFORMATION PROCESSING APPARATUS THAT CHANGES A MESSAGE TO BE DISPLAYED WHEN AN ICON IS OPERATED BY A USER, IN ACCORDANCE WITH SETTING REGARDING A NEAR FIELD WIRELESS COMMUNICATION FUNCTION, METHOD OF CONTROLLING THE SAME, AND NON-TRANSITORY STORAGE MEDIUM

BACKGROUND OF THE INVENTION

Field of the Invention

The present invention relates to an information processing apparatus, and a method of controlling the same.

Description of the Related Art

The performance of a mobile terminal such as a tablet or a smartphone has improved. A user of the mobile terminal can hold various data in the mobile terminal, and transmit the held data to a printing apparatus to print it. To transmit the data from the mobile terminal to the printing apparatus to print it, the mobile terminal searches for the printing apparatus, and determines the found printing apparatus as a print destination printing apparatus. The mobile terminal then wirelessly transmits print data to the print destination printing apparatus.

As a method of determining the print destination printing apparatus, there is provided a method using a near field wireless communication function such as NFC (Near Field Communication) or Bluetooth®, instead of performing the above-described search operation.

The above-described mobile terminal always has such a near field wireless communication function, and the user can arbitrarily set, via the setting screen of the mobile terminal, whether to enable or disable the function. If the near field wireless communication function is always enabled in the mobile terminal, the near field wireless communication function is always active so that the power consumption of the mobile terminal increases and the operating time with a battery becomes short. To prevent such situation, when the near field wireless communication function is not used, the user needs to manually disable the function via the above-described setting screen. For example, Japanese Patent Laid-Open No. 2014-049896 describes a technique in which when a mobile terminal is mounted to a charger located in a specific place, the power of the near field wireless communication function of the mobile terminal is automatically turned on.

As described above, to use the near field wireless communication function of the mobile terminal, it is necessary to turn on the function via the setting screen of the mobile terminal. However, with respect to the screen for turning on/off the near field wireless communication function, for example, after the setting screen for making various settings is opened, it is necessary to select a predetermined setting item in the setting screen, and turn on/off an NFC or Bluetooth setting in the screen of the setting item. In addition, since a menu screen and setting screen are different depending on the mobile terminal of each manufacturer, it is difficult to notify the user of a general method of setting the near field wireless communication function.

SUMMARY OF THE INVENTION

An aspect of the present invention is to eliminate the above-mentioned problems with the conventional techniques.

A feature of the present invention is to provide a technique for allowing a user to readily switch the setting of the near field wireless communication function.

According to a first aspect of the present invention, there is provided an information processing apparatus having a near field wireless communication function, comprising: a setting unit configured to set, as a setting about the near field wireless communication function, one of an ON setting for enabling the near field wireless communication function and an OFF setting for disabling the near field wireless communication function; a display unit configured to display a screen including an icon representing the near field wireless communication function; and a determination unit configured to determine, if a user operates the icon, whether the ON setting has been set by the setting unit or whether the OFF setting has been set by the setting unit, wherein the display unit displays a message based on a result of a determination by the determination unit.

According to a second aspect of the present invention, there is provided an information processing apparatus having a near field wireless communication function, comprising: a setting unit configured to set, as a setting about the near field wireless communication function, one of an ON setting for enabling the near field wireless communication function and an OFF setting for disabling the near field wireless communication function; and a display unit configured to display a screen, wherein if a user operates an icon representing the near field wireless communication function included in the screen and the setting unit has set the ON setting, the display unit displays a first message, and if the user operates the icon representing the near field wireless communication function included in the screen and the setting unit has set the OFF setting, the display unit displays a second message different from the first message.

According to a third aspect of the present invention, there is provided a method of controlling an information processing apparatus having a near field wireless communication function, and capable of setting, as a setting about the near field wireless communication function, one of an ON setting for enabling the near field wireless communication function and an OFF setting for disabling the near field wireless communication function, the method comprising: displaying a screen including an icon representing the near field wireless communication function; determining, if a user operates the icon on the screen, whether the ON setting has been set or whether the OFF setting has been set; and displaying a message based on a result of a determination in the determining.

According to a fourth aspect of the present invention, there is provided a method of controlling an information processing apparatus having a near field wireless communication function, and capable of setting, as a setting about the near field wireless communication function, one of an ON setting for enabling the near field wireless communication function and an OFF setting for disabling the near field wireless communication function, the method comprising: displaying a screen; and displaying a first message if a user operates an icon representing the near field wireless communication function included in the screen and the ON setting has been set, and displaying a second message different from the first message if the user operates the icon representing the near field wireless communication function included in the screen and the OFF setting has been set.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
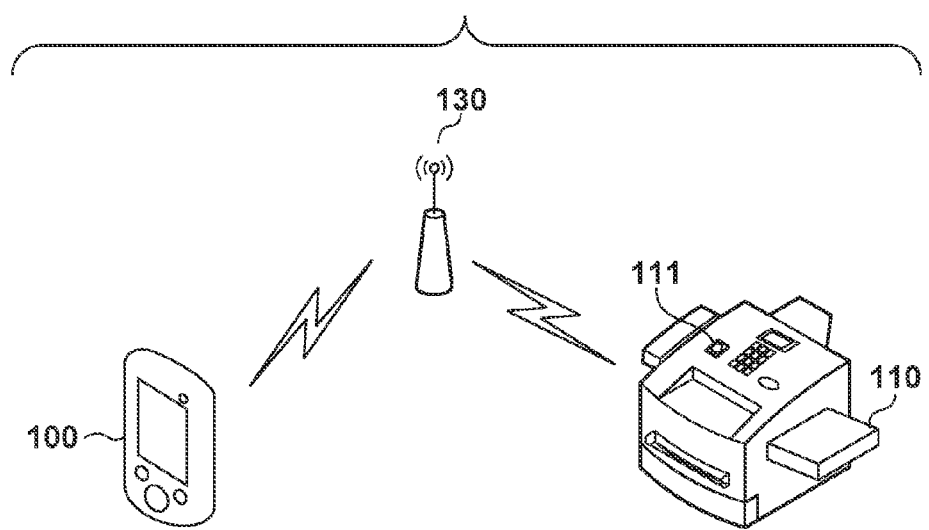
FIG. 1 depicts a view for explaining a configuration of a communication system according to a first embodiment of the present invention.

FIG. 1 depicts a view for explaining a configuration of a communication system according to the first embodiment of the present invention.

The communication system according to the first embodiment includes a mobile terminal 100, a printing apparatus 110, an NFC tag 111 provided in the printing apparatus 110, and an access point 130. The printing apparatus 110 executes wireless communication such as Wi-Fi with the access point 130. Note that communication between the access point 130 and the printing apparatus 110 may be wired communication using a LAN cable or the like.

The mobile terminal 100 can execute wireless communication such as Wi-Fi. When a user inputs the SSID and security key of the access point 130 to the mobile terminal 100, the mobile terminal 100 can be connected to the access point 130. The mobile terminal 100 can find the printing apparatus 110 or the like present in a wireless network by transmitting a search packet by wireless communication via the access point 130. In addition, the mobile terminal 100 can communicate with the printing apparatus 110 via the access point 130. The mobile terminal 100 can transmit a print job to an external apparatus such as the printing apparatus 110 via the access point 130. Upon receiving the print job, the printing apparatus 110 executes printing in accordance with the print job.

The mobile terminal 100 and the printing apparatus 110 can execute near field wireless communication such as NFC. In the first embodiment, the printing apparatus 110 has the NFC tag 111, and a communication packet of the NFC tag 111 includes access information (IP address, MAC address, and model name of the printing apparatus 110) for connection to the printing apparatus 110.

The mobile terminal 100 or another mobile terminal (not shown) can obtain the information of the NFC tag of the printing apparatus 110 using NFC near field wireless communication, and can be connected to the access point 130 based on the obtained information. The processing of switching connection to wireless communication such as Wi-Fi using the information obtained by the near field wireless communication such as NFC is called a handover. By the handover, it is possible to omit the user's labor for inputting, to the mobile terminal 100, the information (the SSID and security key of the access point 130) for connection to the access point 130.

Figure 2:
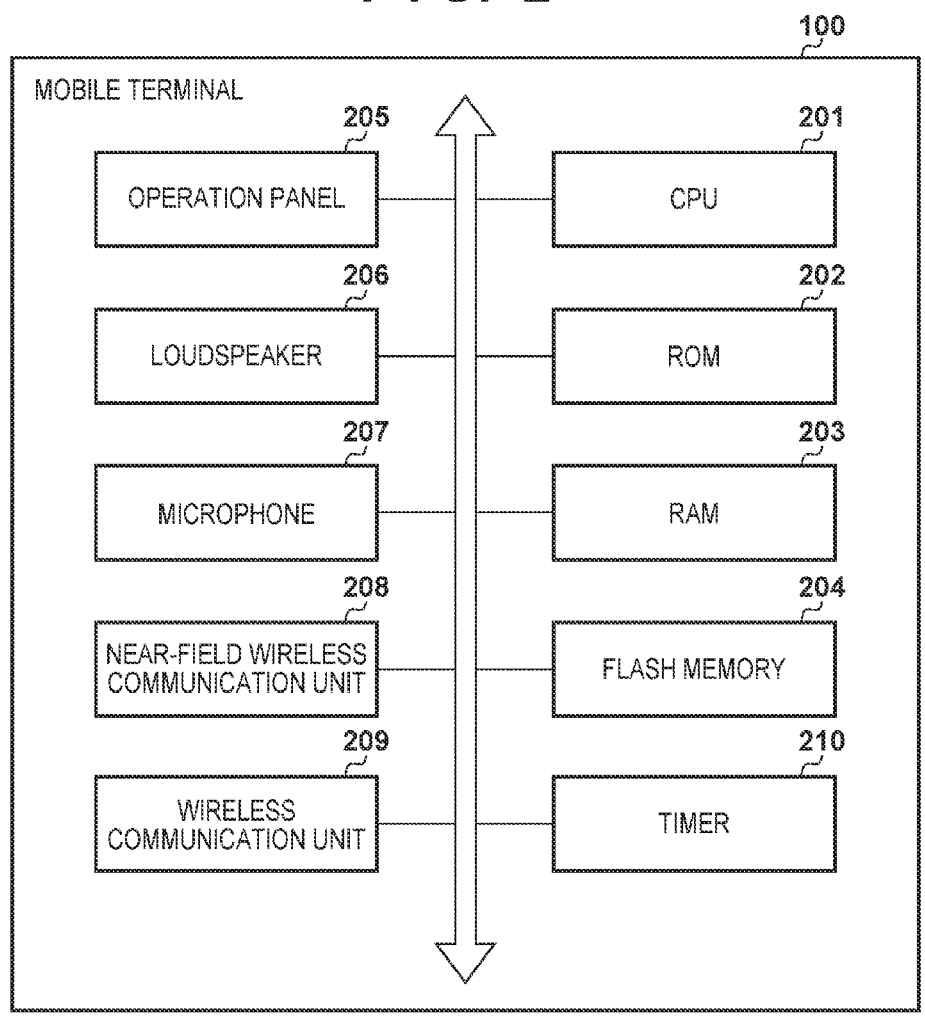
FIG. 2 is a block diagram for explaining a hardware arrangement of a mobile terminal according to the first embodiment.

FIG. 2 is a block diagram for explaining a hardware arrangement of the mobile terminal 100 according to the first embodiment. Note that, for example, an apparatus such as a smartphone or a tablet PC is assumed as the mobile terminal 100 according to the first embodiment. However, any other information processing apparatus capable of executing wireless communication may be used.

A CPU 201 reads out a control program stored in a ROM 202 or a flash memory 204 to execute various processes for controlling the operation of the mobile terminal 100. The ROM 202 stores the control program. A RAM 203 is used as a main memory and a temporary storage area such as a work area for the CPU 201. The flash memory 204 stores various data such as photos and electronic documents. Furthermore, the flash memory 204 stores a print application 301 and an OS (Operating System) 302 (both will be described later with reference to FIG. 3).

Note that in the mobile terminal 100 according to the first embodiment, the one CPU 201 executes respective processes shown in flowcharts (to be described later), but another arrangement may be adopted. For example, it is possible for a plurality of CPUs cooperate with each other to execute the respective processes shown in the flowcharts (to be described alter).

An operation panel 205 has a touch panel function capable of detecting a touch operation by the user. The operation panel 205 displays various screens provided by the OS 302 and an application. The user can input a desired operation instruction to the mobile terminal 100 by performing a touch operation to the operation panel 205. The mobile terminal 100 includes hardware keys (not shown), and the user can input an operation instruction to the mobile terminal 100 using the hardware keys.

A loudspeaker 206 and a microphone 207 are used when the user calls another mobile terminal (mobile phone) or a fixed-line phone. A near-field wireless communication unit 208 executes NFC near field wireless communication. In the first embodiment, the printing apparatus 110 includes the NFC tag. When the user brings the mobile terminal 100 closer to the NFC tag 111 of the printing apparatus 110 (touches the NFC tag with the mobile terminal 100), near field wireless communication is established between the near-field wireless communication unit 208 and the NFC tag 111 of the printing apparatus 110. Thus, the near-field wireless communication unit 208 can obtain the information of the NFC tag 111.

A wireless communication unit 209 executes wireless communication such as Wi-Fi. The mobile terminal 100 can search for and find the printing apparatus 110 to be communicable via the access point 130 by transmitting a search packet via the wireless communication unit 209. Furthermore, by using the handover, the mobile terminal 100 can implement wireless communication by the wireless communication unit 209 with a simple operation for the user. More specifically, using the connection information (the SSID and password of the access point 130) obtained by the near-field wireless communication unit 208 from the NFC tag 111 of the printing apparatus 110, the wireless communication unit 209 can perform connection to the access point 130.

A timer (RTC) 210 times an amount of time. When an amount of time set by the CPU 201 elapses, the timer 210 uses an interrupt to notify the CPU 201 that the designated amount of time has elapsed.

Figure 3:
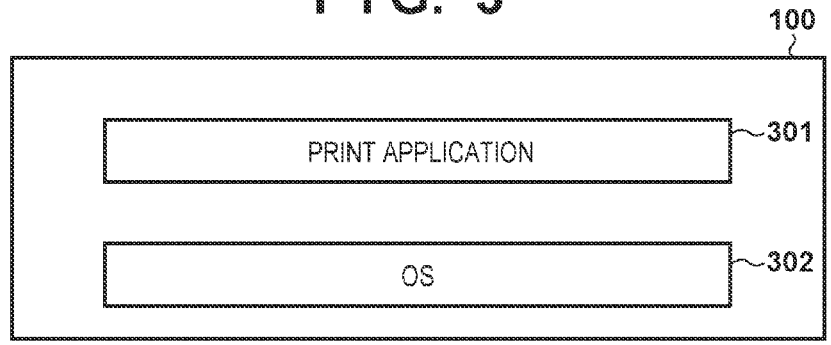
FIG. 3 is a block diagram for explaining a software configuration of the mobile terminal according to the first embodiment.

FIG. 3 is a block diagram for explaining a software configuration of the mobile terminal 100 according to the first embodiment. Note that the programs are stored in the ROM 202 or the flash memory 204, and the CPU 201 deploys the programs in the RAM 203, and executes them.

The OS 302 is software for controlling the overall operation of the mobile terminal 100. Various applications including the print application 301 (to be described later) can be installed in the mobile terminal 100. The OS 302 exchanges information with each application, and changes a screen displayed on the operation panel 205 in accordance with an instruction received from the application. In addition, the OS 302 executes wireless communication by the near-field wireless communication unit 208 or the wireless communication unit 209.

The print application 301 is an application installed in the mobile terminal 100. This application searches for the printing apparatus using the near-field wireless communication unit 208, and executes print processing by performing a connection to the printing apparatus 110 using the information for communicating with the printing apparatus 110, which is written in the NFC tag 111. Note that in addition to the print application 301, various applications are installed in the mobile terminal 100 but a description thereof will be omitted.

Figure 4:
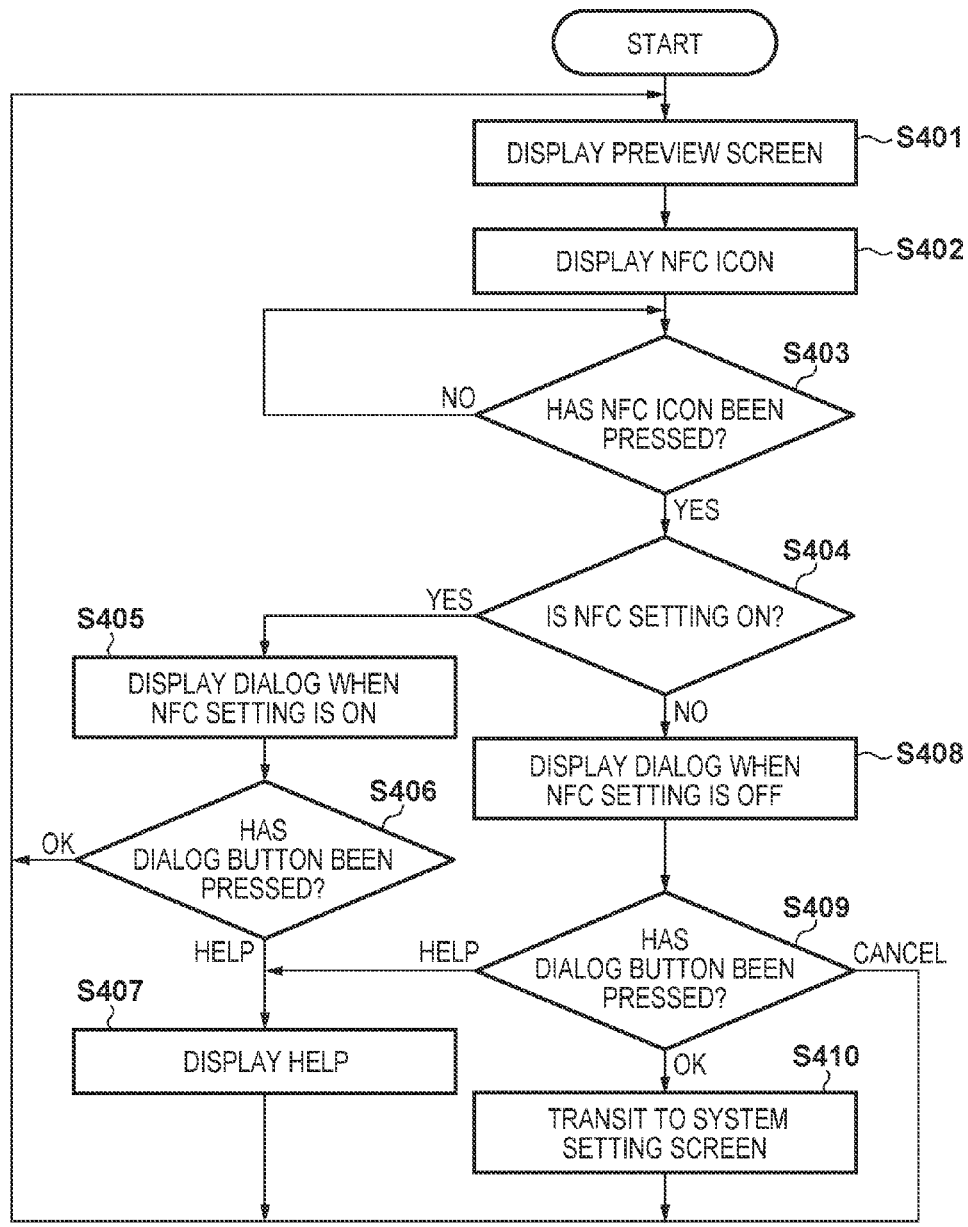
FIG. 4 is a flowchart for describing processing of the mobile terminal according to the first embodiment.

FIG. 4 is a flowchart for describing the processing of the mobile terminal 100 according to the first embodiment. FIG. 4 shows a series of processes for display control of a screen displayed by the print application 301 of the mobile terminal 100. Note that a program for executing the processes is stored in the ROM 202 or the flash memory 204. The program is deployed in the RAM 203 when executed, and executed under the control of the CPU 201, thereby implementing the processes. A case in which a user is caused to confirm ON/OFF of the NFC setting while a preview screen for printing is displayed on the operation panel 205 will be exemplified.

Figure 5A:
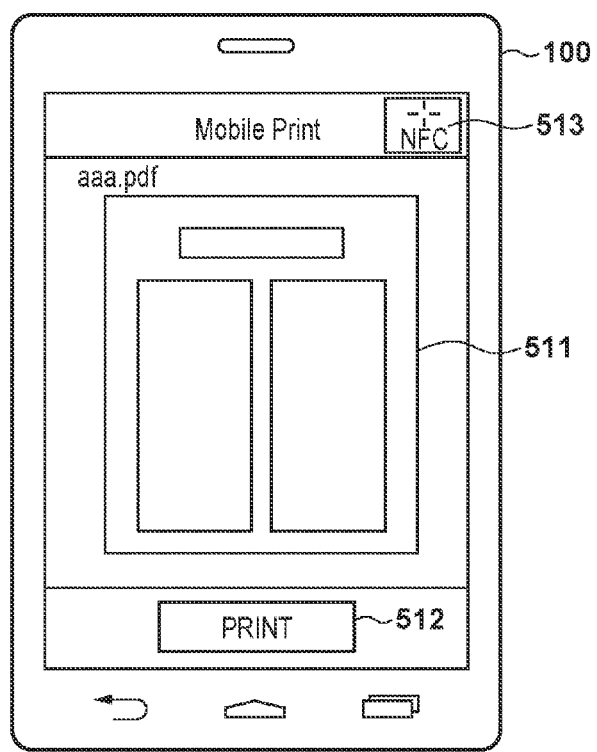
FIGS. 5A and 5B depict views each showing a screen example displayed on an operation panel of the mobile terminal according to the first embodiment.

In step S401, the CPU 201 displays, as a preview screen, a file selected by the user on the operation panel 205, as shown in, for example, FIG. 5A. Note that an NFC icon 513 is displayed in FIG. 5A but is not displayed if the mobile terminal 100 includes no near-field wireless communication unit 208.

FIG. 5A depicts a view showing a state in which the preview screen for printing is displayed on the operation panel 205 of the mobile terminal 100 according to the first embodiment.

In this example, a selected document file 511, a print button 512 for instructing start of printing, and the NFC icon 513 are displayed. Note that as described above, if the mobile terminal 100 includes no near-field wireless communication unit 208, the NFC icon 513 is not displayed. In this state, if the mobile terminal 100 is not connected to the printing apparatus 110 by wireless communication, no print button 512 is displayed, or no instruction is accepted even if the print button 512 is touched.

The process advances to step S402, and the CPU 201 displays the NFC icon 513 since the mobile terminal 100 includes the near-field wireless communication unit 208 for NFC setting. After that, the process advances to step S403. Note that the processing in step S402 may be performed simultaneously with the preview display processing in step S401.

In step S403, the CPU 201 determines a user operation on the operation panel 205. If it is determined that the NFC icon 513 has been touched, the process advances to step S404. In step S404, the CPU 201 inquires of the OS 302 as to whether the NFC setting is ON. If it is determined that the NFC setting is ON, the process advances to step S405; otherwise, the process advances to step S408. In step S405, the CPU 201 displays, for example, a dialog shown in FIG. 5B on the operation panel 205.

Figure 5B:
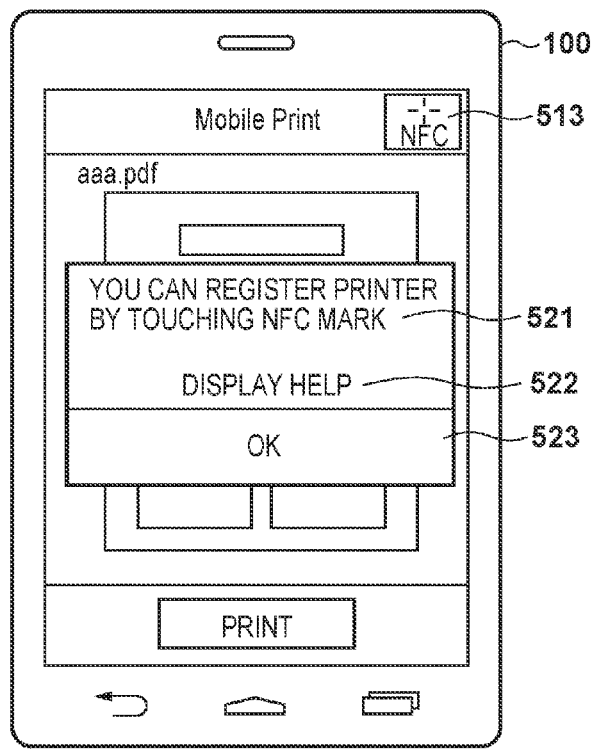

FIG. 5B depicts a view showing a screen example displayed on the operation panel 205 when the NFC setting is ON in the mobile terminal 100 according to the first embodiment.

In this dialog, an explanation 521 about a touch on the NFC mark (NFC tag 111) of the printer, a message 522 for displaying more detailed help, and an OK button 523 for closing this dialog are arranged.

Next, the process advances to step S406, and the CPU 201 determines a user operation on the operation panel 205. If it is determined that the message 522 for help display has been touched, the process advances to step S407. In step S407, the CPU 201 performs help display (not shown) for displaying detailed help on the operation panel 205. Then, the process returns to step S401. On the other hand, if it is determined in step S406 that the OK button 523 has been touched, this screen is closed, and the process returns to step S401.

After that, the user of the mobile terminal 100 brings the mobile terminal 100 closer to the NFC tag 111 of the printing apparatus 110. With this operation, the information of the NFC tag 111 is obtained by the mobile terminal 100. Based on the obtained information, the mobile terminal 100 is connected to the access point 130, and the connection to the printing apparatus 110 is switched to wireless communication such as Wi-Fi by the handover. This enables the print button 512. When a user touches the print button 512, data of the document file 511 displayed in FIG. 5A is transmitted to the printing apparatus 110, and printed.

Figure 6A:
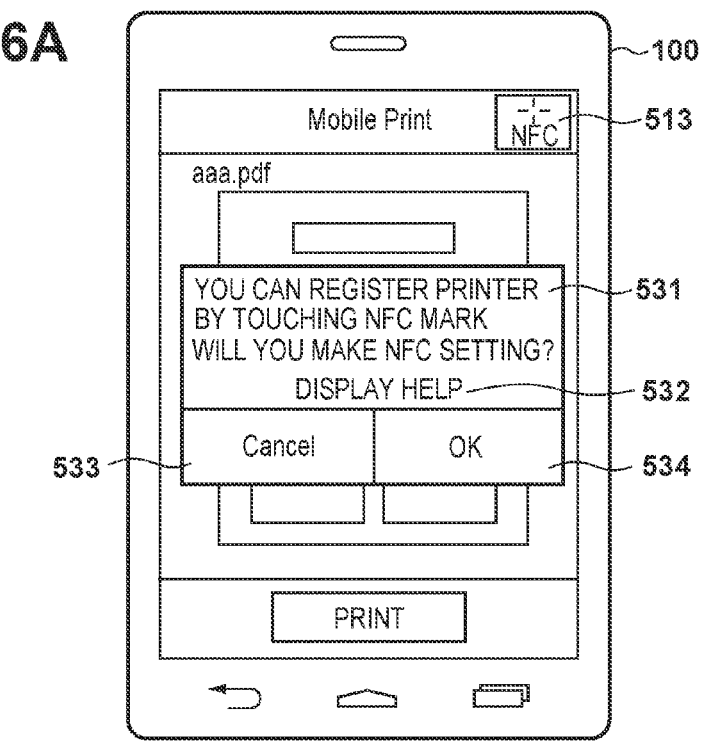
FIGS. 6A and 6B depict views each showing a screen example displayed on the operation panel of the mobile terminal according to the first embodiment.

On the other hand, if the CPU 201 determines in step S404 that the NFC setting is OFF, the process advances to step S408, and the CPU 201 displays, for example, a dialog shown in FIG. 6A on the operation panel 205.

FIG. 6A depicts a view showing a screen example displayed on the operation panel 205 when the NFC setting is OFF in the mobile terminal 100 according to the first embodiment.

In this dialog, an explanation 531 about a touch on the NFC mark (NFC tag) of the printer, a message 532 for displaying more detailed help, a cancel button 533 for canceling the setting in this dialog, and an OK button 534 are arranged. The OK button 534 is a button used to instruct transition to an NFC setting screen shown in FIG. 6B.

The process advances to step S409, and the CPU 201 determines a user operation on the operation panel 205 on which the screen of FIG. 6A is displayed. If it is determined that the user operation is a touch on the message 532 for help display, the process advances to step S407 to perform the above-described help display. Then, the process returns to step S401. If the pressing of the cancel button 533 is detected, the process returns to the preview display processing in step S401. If the pressing of the OK button 534 is detected, the process advances to step S410. In step S410, the CPU 201 requests, of the OS 302, processing of displaying, for example, the NFC setting screen provided by the OS and shown in FIG. 6B.

Figure 6B:
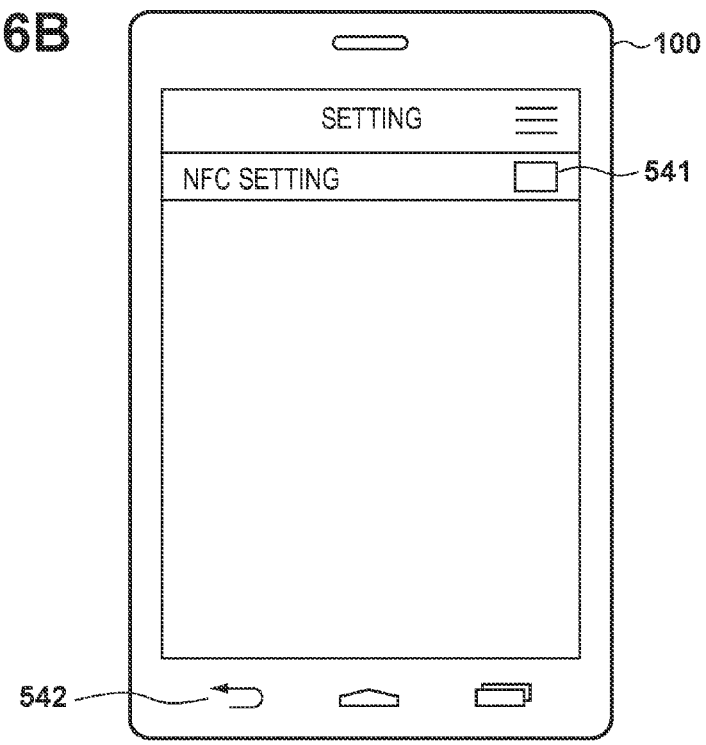

FIG. 6B depicts a view showing an example of the NFC setting screen displayed on the operation panel 205 of the mobile terminal 100 according to the first embodiment. This screen is displayed by the OS 302.

The state of FIG. 6B indicates a state in which the NFC setting is OFF. In this state, if the user touches an NFC setting 541 of the operation panel 205, the NFC setting transits to an enable state (ON). If the user touches a return button 542, the process returns to the print application 301, thereby returning to step S401.

If the NFC setting is changed to the ON state, the process advances from step S404 to step S405 to display, for example, the dialog shown in FIG. 5B on the operation panel 205. After that, as described above, the user of the mobile terminal 100 can bring this mobile terminal 100 closer to the NFC tag 111 of the printing apparatus 110 and touch the NFC tag 111 with the mobile terminal 100 so that the connection to the printing apparatus 110 is switched to wireless communication such as Wi-Fi by the handover, thereby it is possible for the printing apparatus 110 to execute printing in accordance with print data sent from the mobile terminal 100.

As described above, according to the first embodiment, a message displayed to the user is changed in accordance with the state of the NFC setting of the mobile terminal, thereby allowing the user to readily change the NFC setting. With this arrangement, the user can turn off the NFC setting to suppress power consumption when the NFC setting is not used, and readily enable the NFC setting by only performing an operation in accordance with an instruction on the screen when the NFC setting becomes necessary. This allows the user to readily switch the setting of the NFC setting, thereby effectively performing an operation for suppressing the power consumption of the mobile terminal.

Second Embodiment

The second embodiment of the present invention will be described next. In the above-described first embodiment, in step S410 of the flowchart of FIG. 4, the screen transits to the system setting screen shown in FIG. 6B. However, if the OS 302 provides an API (Application Programming Interface) for controlling the NFC setting from the application of the mobile terminal 100, the print application 301 may instruct the OS 302 to enable the NFC setting. Note that the hardware arrangements of a mobile terminal 100, a printing apparatus 110, and the like according to the second embodiment are the same as those in the first embodiment and a description thereof will be omitted.

Figure 7:
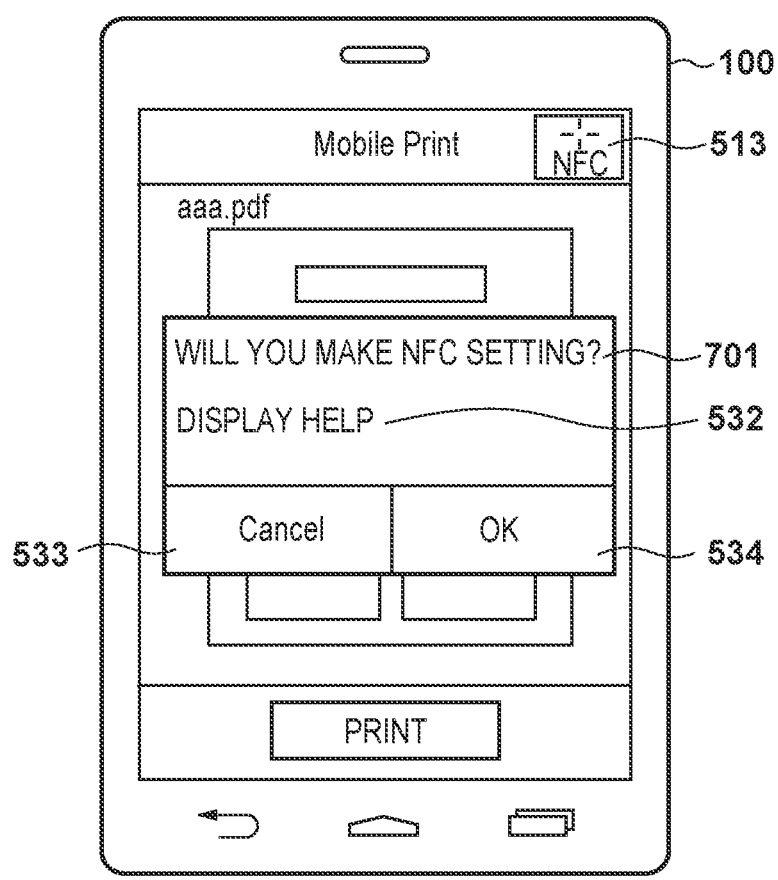
FIG. 7 depicts a view showing a screen example displayed on an operation panel when an NFC setting is OFF in a mobile terminal according to a second embodiment.

FIG. 7 depicts a view showing a screen example displayed on an operation panel 205 when an NFC setting is OFF in the mobile terminal 100 according to the second embodiment. The same reference numerals as those in FIG. 6A described above denote common parts.

The screen has an arrangement different from that of the screen of FIG. 6A described above. A message 701, provided from the OS 302, for confirming whether to turn on the NFC setting is displayed.

When an OK button 534 is pressed, the OS 302 turns on the NFC setting of the mobile terminal 100 without displaying the setting screen shown in FIG. 6B described above.

Figure 8:
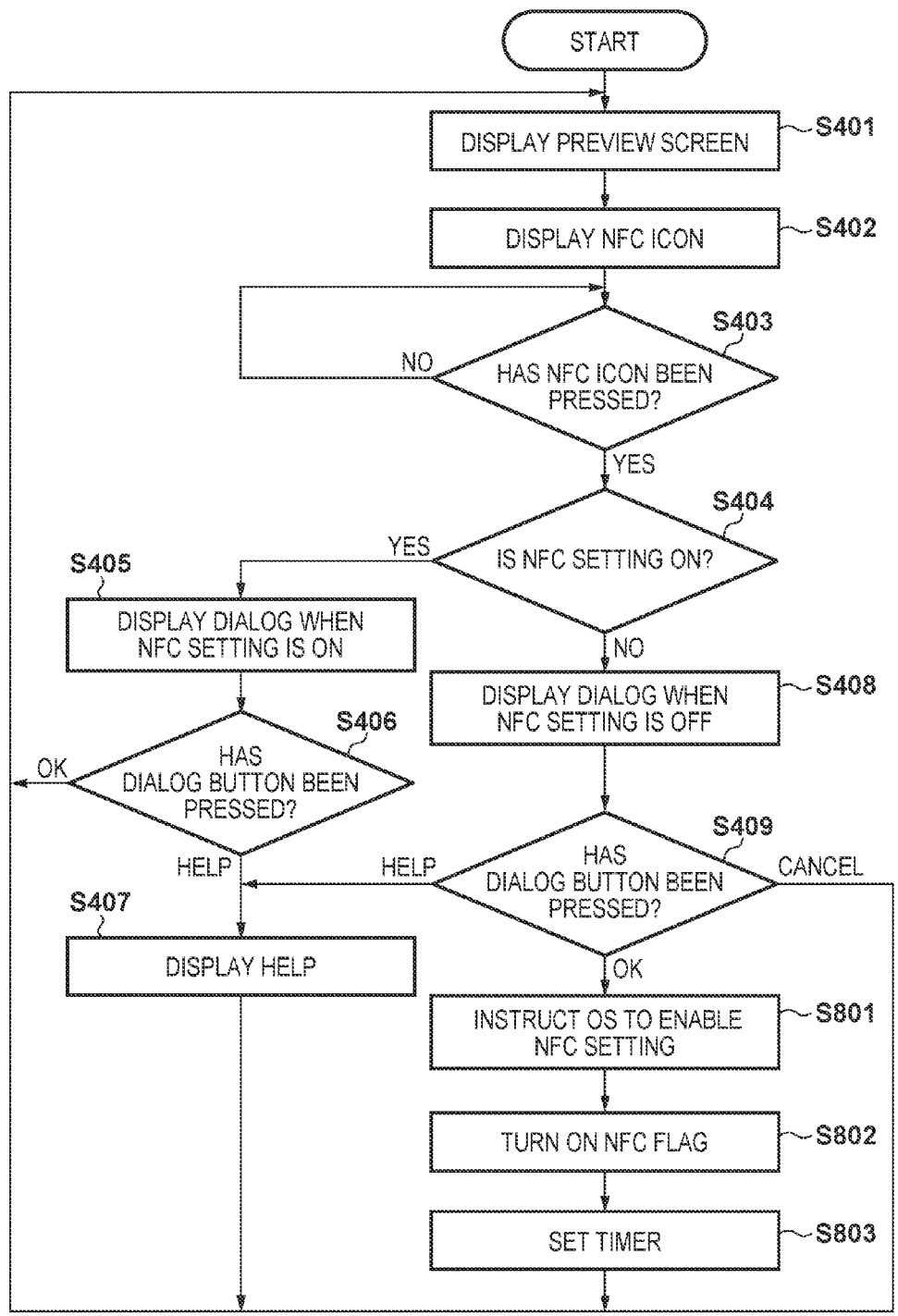
FIG. 8 is a flowchart for describing processing of the mobile terminal according to the second embodiment.

FIG. 8 is a flowchart for describing processing of the mobile terminal 100 according to the second embodiment. FIG. 8 shows a series of processes of display control of a screen displayed by a print application 301 of the mobile terminal 100. Note that a program for executing the processes is stored in a ROM 202 or a flash memory 204. The program is deployed in a RAM 203 when executed, and executed by a CPU 201, thereby implementing the processes. The same reference symbols as those in FIG. 4 described above denote common processes and a description thereof will be omitted.

In step S409, if the OK button 534 is pressed while, for example, the screen shown in FIG. 7 is displayed, the process advances to step S801. In step S801, the CPU 201 instructs the OS 302 to enable (turn on) the NFC setting. This causes the OS 302 to turn on the NFC setting of the mobile terminal 100 without displaying the setting screen as shown in FIG. 6B described above. The process advances to step S802, and the CPU 201 sets, in the RAM 203, a flag indicating that NFC has been enabled. A predetermined amount of time for defining an amount of time during which NFC is enabled is set in the timer 210, and the process returns to step S401. With this processing, when the timer 210 times the predetermined amount of time, an interrupt is generated for the CPU 201.

Figure 9:
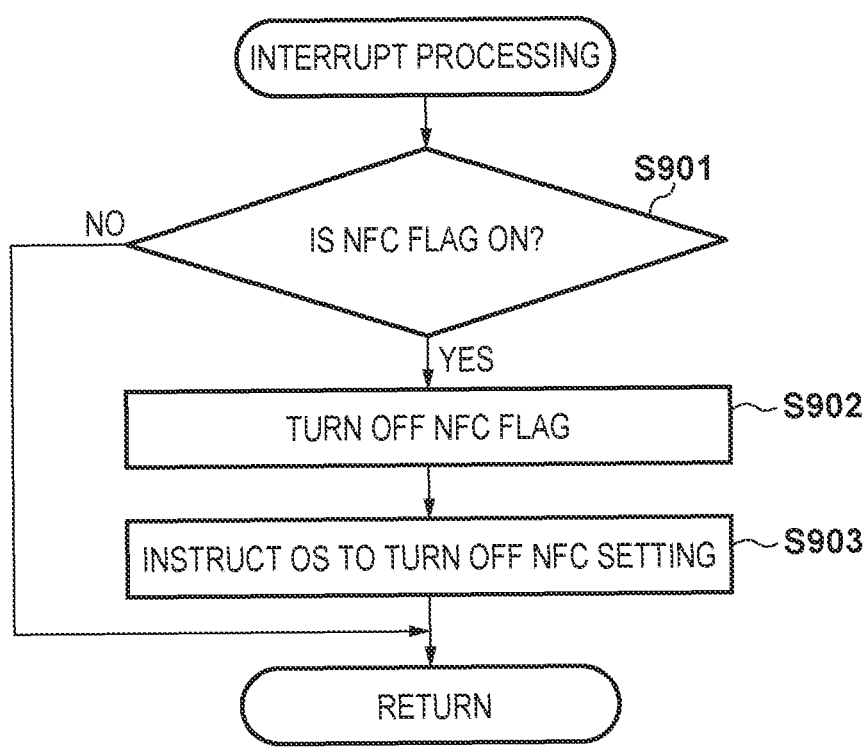
FIG. 9 is a flowchart for describing processing performed, due to an interrupt from a timer, by a CPU of the mobile terminal according to the second embodiment.

FIG. 9 is a flowchart for describing processing performed by the CPU 201 of the mobile terminal 100 due to the interrupt from the timer 210 according to the second embodiment. Note that a program for executing this processing is stored in the ROM 202 or the flash memory 204. The program is deployed in the RAM 203 when executed, and executed by the CPU 201, thereby implementing the processing.

When an interrupt from the timer 210 is generated, the process advances to step S901, and the CPU 201 determines whether or not the NFC flag set in the RAM 203 in step S802 of FIG. 8 described above is ON. If it is determined that the NFC flag is ON, that is, the OS 302 has turned on the NFC setting of the mobile terminal 100, the process advances to step S902 to turn off the NFC flag. Then, the process advances to step S903, and the CPU 201 instructs the OS 302 to disable (turn off) the NFC setting, thereby terminating the processing. If it is determined in step S901 that the NFC flag is OFF, that is, the OS 302 has not turned on the NFC setting of the mobile terminal 100, the process ends without performing any processing.

Note that an interrupt has been exemplified. The present invention, however, is not limited to this. For example, the CPU 201 may periodically inquire a value timed by the timer 210, and determine whether or not the set amount of time has elapsed.

As a condition for turning off the NFC setting, for example, the NFC setting may be returned to the OFF state upon completion of transmission of a print job.

As described above, according to the second embodiment, it is possible to change, in accordance with the state of the NFC setting of the mobile terminal, a message in a dialog displayed to the user, and also readily change the NFC setting without intervention of the NFC setting screen of FIG. 6B.

If the OS 302 turns on the NFC setting of the mobile terminal 100, the NFC setting is automatically turned off when the predetermined time has elapsed, thereby suppressing an increase in power consumption caused when the NFC setting remains ON.

The NFC setting may be turned off, for example, when print processing ends by the handover or when the handover is complete.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-158498, filed Aug. 10, 2015 which is hereby incorporated by reference herein in its entirety.

What is claimed is:

1. An information processing apparatus comprising:
a display device; and
at least one control circuit,
wherein the at least one control circuit acts as units comprising:
(a) a display control unit configured to display, on the display device, a print preview screen including an icon for causing to display guidance related to a near field wireless communication function in accordance with a user's operation on the icon, in a case that the information processing apparatus has a near field wireless communication circuit for controlling the near field wireless communication function, and to display, on the display device, the print preview screen without the icon, in a case that the information processing apparatus does not have the near field wireless communication circuit;
(b) a setting unit configured to set, as a setting regarding the near field wireless communication function, one of an ON setting for enabling the near field wireless communication function and an OFF setting for disabling the near field wireless communication function, wherein the setting is enabled in the case that the information processing apparatus has the near field wireless communication circuit; and
(c) a determination unit configured to determine, in a case where the user operates the icon, whether the ON setting has been set by the setting unit or whether the OFF setting has been set by the setting unit,
wherein upon a condition in which the information processing apparatus has the near field wireless communication circuit and the determination unit has determined that the setting unit has set the ON setting, the display control unit displays, as the guidance, a first guidance for prompting the user to touch a printing apparatus with the information processing apparatus,
wherein upon a condition in which the information processing apparatus has the near field wireless communication circuit and determination unit has determined that the setting unit has set the OFF setting, the display control unit displays, as the guidance, a second guidance for prompting the user to change the setting regarding the near field wireless communication function.

2. The information processing apparatus according to claim 1, wherein, in the case where (1) a user instruction is accepted in a state in which the second guidance is being displayed on the display device and (2) the user instruction instructs to change the setting regarding the near field wireless communication function, the display control unit displays a setting screen to be used by the user to set the setting regarding the near field wireless communication function.

3. The information processing apparatus according to claim 1, wherein the near field wireless communication function is a function of performing wireless communication by NFC.

4. An information processing apparatus, the information processing apparatus comprising:
a display device; and
at least one control circuit,
wherein the at least one control circuit acts as units comprising:
a display control unit configured to display, on the display device, a print preview screen including an icon for causing to display guidance related to a near field wireless communication function in accordance with a user's operation on the icon, in a case that the information processing apparatus has a near field wireless communication circuit for controlling the near field wireless communication function, and to display, on the display device, the print preview screen without the icon, in a case that the information processing apparatus does not have the near field wireless communication circuit; and
a setting unit configured to set, as a setting regarding the near field wireless communication function, one of an ON setting for enabling the near field wireless communication function and an OFF setting for disabling the near field wireless communication function, wherein the setting is enabled in the case that the information processing apparatus has the near field wireless communication circuit;

wherein upon a condition in which the user operates the icon on the print preview screen and the setting unit has set the ON setting, the display control unit displays, as the guidance, a first guidance for prompting the user to touch a printing apparatus with the information processing apparatus, wherein upon a condition in which the user operates the icon on the print preview screen and the setting unit has set the OFF setting, the display control unit displays, as the guidance, a second guidance for prompting the user to change the setting regarding the near field wireless communication function.

5. The information processing apparatus according to claim 4, wherein, in the case where (1) a user instruction is accepted in a state in which the second guidance is being displayed on the display device and (2) the user instruction instructs to change the setting regarding the near field wireless communication function, the display control unit displays a setting screen to be used by the user to set the setting regarding the near field wireless communication function.

6. The information processing apparatus according to claim 4, wherein the near field wireless communication function is a function of performing wireless communication by NFC.

7. A method of controlling an information processing apparatus having an OS(Operating System), the OS being capable of setting either an ON setting for enabling a near field wireless communication function or an OFF setting for disabling the near field wireless communication function, in a case that the information processing apparatus has a near field wireless communication circuit for controlling the near field wireless communication function, the method comprising:

displaying a print preview screen including an icon for causing to display of guidance related to the near field wireless communication function in accordance with a user's operation on the icon, in a case that the information processing apparatus has the near field wireless communication circuit, and displaying the print preview screen without the icon, in a case that the information processing apparatus does not have the near field wireless communication circuit;

determining, when the user operates the icon on the print preview screen, whether the ON setting has been set or whether the OFF setting has been set based on a response from the OS;

displaying, as the guidance, in a case where it is determined in the determining that the ON setting has been set, a first guidance for prompting the user to touch a printing apparatus with the information processing apparatus; and displaying, as the guidance, in a case where it is determined in the determining that the OFF setting has been set, a second guidance for prompting the user to change the setting regarding the near field wireless communication.

8. The method according to claim 7, further comprising:
requesting for the OS, in the case where (1) a user instruction is accepted in a state in which the second guidance is being displayed and (2) the user instruction instructs to change the setting regarding the near field wireless communication function, to display a setting screen to be used by the user to set the setting regarding the near field wireless communication function.

9. The method according to claim 7, wherein the near field wireless communication function is a function of performing wireless communication by NFC.

10. A method of controlling an information processing apparatus having an OS(Operating System), the OS being capable of setting either an ON setting for enabling a near field wireless communication function or an OFF setting for disabling the near field wireless communication function, in a case that the information processing apparatus has a near field wireless communication circuit for controlling the near field wireless communication function, the method comprising:

displaying a print preview screen including an icon for causing display of guidance related to the near field wireless communication function in accordance with a user's operation on the icon, a case that the information processing apparatus has the near field wireless communication circuit, and displaying the print preview screen without the icon, in a case that the information processing apparatus does not have the near field wireless communication circuit;

displaying, as the guidance, upon a condition in which a user operates the icon on the print preview screen and the ON setting has been set, a first guidance for prompting the user to touch a printing apparatus with the information processing apparatus; and displaying, as the guidance, upon a condition in which the user operates the icon on the print preview screen and the OFF setting has been set, a second guidance for prompting the user to change the setting regarding the near field wireless communication function.

11. The method according to claim 10, further comprising:
requesting for the OS, in the case where (1) a user instruction is accepted in a state in which the second guidance is being displayed and (2) the user instruction instructs to change the setting regarding the near field wireless communication function, a setting screen to be used by the user to set the setting regarding the near field wireless communication function.

12. The method according to claim 10, wherein the near field wireless communication function is a function of performing wireless communication by NFC.

13. A non-transitory computer-readable storage medium storing a program for causing a processor to execute a method of controlling a mobile terminal having an OS(Operating System), the OS being capable of setting either an ON setting for enabling a near field wireless communication function or an OFF setting for disabling the near field wireless communication function, in a case that the information processing apparatus has a near field wireless communication circuit for controlling the near field wireless communication function, the method comprising:

displaying a print preview screen including an icon for causing to display of guidance related to the near field wireless communication function in accordance with a user's operation on the icon, in a case that the information processing apparatus has the near field wireless communication circuit, and displaying the print preview screen without the icon, in a case that the information processing apparatus does not have the near field wireless communication circuit;

displaying, as the guidance, upon a condition in which the information processing apparatus has the near field wireless communication circuit and the user operates the icon on the print preview screen and the ON setting has been set, a first guidance for prompting the user to touch a printing apparatus with the mobile terminal; and displaying, as the guidance, upon a condition in which a user operates the icon on the print preview screen and the setting unit has set the OFF setting, a second guidance for prompting the user to change the setting regarding the near field wireless communication function.

* * * * *